US012689975B2

(12) United States Patent
Li et al.

(10) Patent No.: US 12,689,975 B2
(45) Date of Patent: Jul. 21, 2026

(54) WIRELESS COMMUNICATION APPARATUS AND WIRELESS COMMUNICATION METHOD THEREOF HAVING TRANSMISSION STRATEGY ADJUSTING MECHANISM

(71) Applicant: REALTEK SEMICONDUCTOR CORPORATION, Hsinchu (TW)

(72) Inventors: Wei-Shin Li, Hsinchu (TW); Chun-Chu Chang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 384 days.

(21) Appl. No.: 18/201,789

(22) Filed: May 25, 2023

(65) Prior Publication Data
US 2023/0413172 A1 Dec. 21, 2023

(30) Foreign Application Priority Data
Jun. 17, 2022 (TW) .................................. 111122573

(51) Int. Cl.
*H04W 48/20* (2009.01)
*H04W 24/10* (2009.01)
(52) U.S. Cl.
CPC ........... *H04W 48/20* (2013.01); *H04W 24/10* (2013.01)
(58) Field of Classification Search
CPC .............................. H04W 24/10; H04W 48/20
USPC ......................................................... 370/329
See application file for complete search history.

(56) References Cited

U.S. PATENT DOCUMENTS

| | | | |
|---|---|---|---|
| 9,628,361 B2 | 4/2017 | Kim et al. | |
| 9,917,752 B1 * | 3/2018 | Ram ....................... | H04L 43/08 |
| 10,412,677 B2 | 9/2019 | Choi et al. | |
| 2016/0295580 A1 * | 10/2016 | Katar ................ | H04W 72/0446 |
| 2020/0076239 A1 * | 3/2020 | Taniguchi .............. | H02J 50/80 |
| 2020/0396695 A1 * | 12/2020 | Bhushan .............. | H04B 17/336 |

(Continued)

OTHER PUBLICATIONS

Al-saraireh, Adaptive Distributed Inter Frame Space for IEEE 802.11 MAC Protocol, Communications and Network, 2014, 6, 165-174 (Year: 2014).*

(Continued)

*Primary Examiner* — Asad M Nawaz
(74) *Attorney, Agent, or Firm* — WPAT, PC

(57) ABSTRACT
The present invention discloses a wireless communication apparatus having transmission strategy adjusting mechanism that includes a receiving circuit, a detection circuit, a statistics circuit, a strategy determining circuit and a transmission circuit. The receiving circuit receives communication behaviors of external apparatuses. The detection circuit detects inter frame spaces (IFS) corresponding to the communication behaviors and records related time lengths and a set of communication parameters. The statistics circuit performs statistics on the inter frame space according to a plurality of time intervals to generate Inter frame space statistics data. The strategy determining circuit analyzes at least one of the time lengths, communication parameters and Inter frame space statistics data according to at least one application requirement to generate a transmission parameter adjusting signal. The transmission circuit receives the transmission parameter adjusting signal to adjust transmission parameters related to the IFS length to perform data transmission.

20 Claims, 3 Drawing Sheets

300

```
┌──────────────────────────────────────────────────────────┐  ┌ S310
│  Receive data of communication behaviors among external   │
│  apparatuses by receiving circuit                          │
└──────────────────────────────────────────────────────────┘
                          │
                          ▼
┌──────────────────────────────────────────────────────────┐  ┌ S320
│ Detect inter frame spaces corresponding to communication  │
│ behaviors and record related time lengths and set of      │
│ communication parameters by detection circuit             │
└──────────────────────────────────────────────────────────┘
                          │
                          ▼
┌──────────────────────────────────────────────────────────┐  ┌ S330
│ Perform statistics on inter frame spaces according to     │
│ time intervals to generate inter frame space statistics   │
│ data by statistics circuit                                │
└──────────────────────────────────────────────────────────┘
                          │
                          ▼
┌──────────────────────────────────────────────────────────┐  ┌ S340
│ Analyze at least one of related time lengths, set of      │
│ communication parameters and the inter frame space        │
│ statistics data of inter frame spaces according to at     │
│ least one application requirement to generate transmission│
│ parameter adjusting signal by strategy determining circuit│
└──────────────────────────────────────────────────────────┘
                          │
                          ▼
┌──────────────────────────────────────────────────────────┐  ┌ S350
│ Receive transmission parameter adjusting signal to adjust │
│ transmission parameters related to inter frame space      │
│ length to perform data transmission by transmission       │
│ circuit                                                   │
└──────────────────────────────────────────────────────────┘
```

(56) References Cited

U.S. PATENT DOCUMENTS

| 2024/0235750 | A1* | 7/2024 | Omar | .................... | H04L 5/0035 |
| 2026/0122519 | A1* | 4/2026 | Sung | .................... | H04L 1/0026 |

OTHER PUBLICATIONS

Prepared by the 802.11 Working Group of the LAN/MAN Standards Committee of the IEEE Computer Society, IEEE 802.11ax spec specification (Draft P802.11ax_D6.0), Nov. 2019 by the IEEE.
Wi-Fi Alliance® Technical Committee WMM®—Admission Control Technical Task Group, Wi-Fi WMM Specification—Wi-Fi Alliance (Wi-Fi_WMM_Specification_v1.2.0), 2012 Wi-Fi Alliance.

* cited by examiner

100

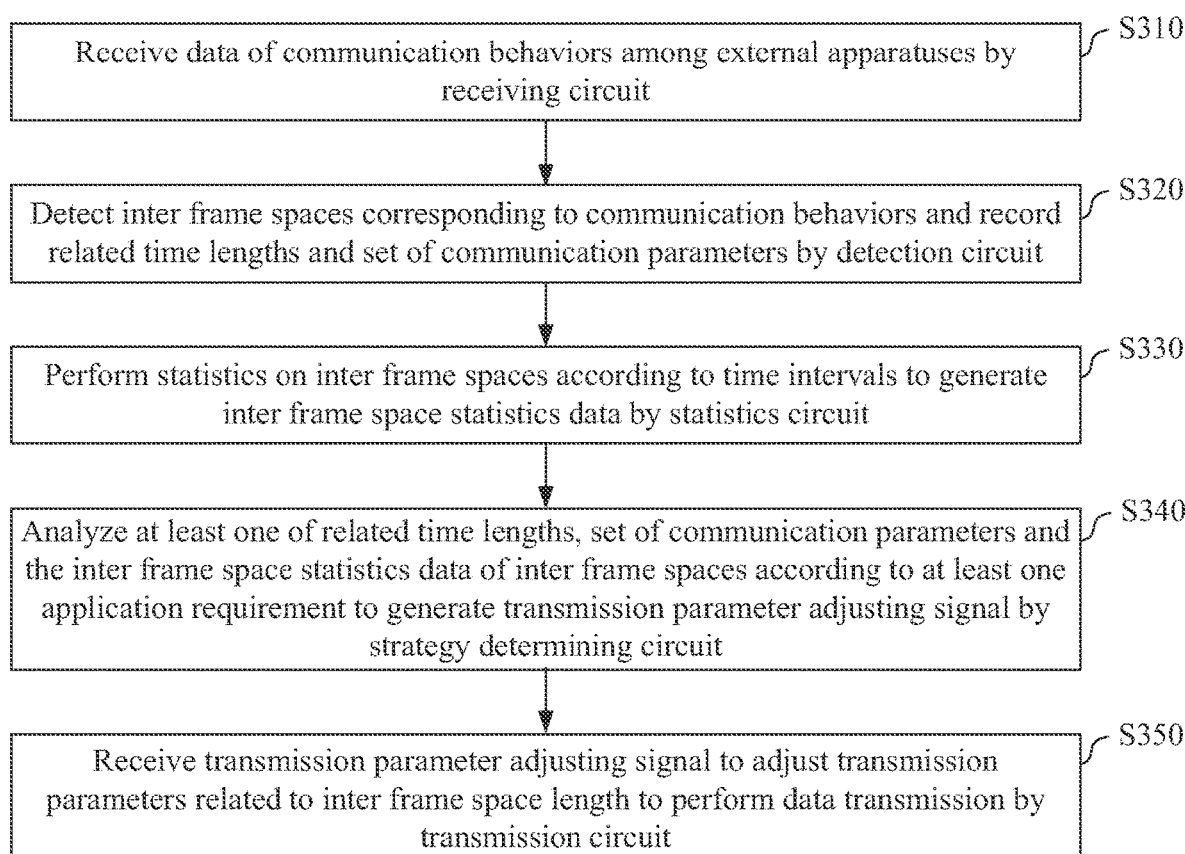

300

Receive data of communication behaviors among external apparatuses by receiving circuit    S310

Detect inter frame spaces corresponding to communication behaviors and record related time lengths and set of communication parameters by detection circuit    S320

Perform statistics on inter frame spaces according to time intervals to generate inter frame space statistics data by statistics circuit    S330

Analyze at least one of related time lengths, set of communication parameters and the inter frame space statistics data of inter frame spaces according to at least one application requirement to generate transmission parameter adjusting signal by strategy determining circuit    S340

Receive transmission parameter adjusting signal to adjust transmission parameters related to inter frame space length to perform data transmission by transmission circuit    S350

Fig. 3

WIRELESS COMMUNICATION APPARATUS AND WIRELESS COMMUNICATION METHOD THEREOF HAVING TRANSMISSION STRATEGY ADJUSTING MECHANISM

BACKGROUND OF THE INVENTION

1. Field of the Invention

The present invention relates to a wireless communication apparatus and a wireless communication method thereof having transmission strategy adjusting mechanism.

2. Description of Related Art

Wireless network communication becomes an important network communication technology due to the advantage of the absence of physical transmission wires, which is beneficial to network establishment. One of the most popular wireless network communication technologies is WiFi technology.

Along with the development and application of the network technology, the demands on mobility and reliability of the network become higher. In order to increase the communication efficiency among different station apparatuses, access point apparatuses need to perform evaluation and adjustment on parameters of such as an enhanced distributed channel access (EDCA) parameter to perform scheduling based on different application priority to avoid the interference of different communication behaviors. However, such a method needs to be performed according to interactions among the access point apparatuses and the station apparatuses so as retrieve related information. Further, the adjustment can not be performed elastically based on the requirements of individual apparatuses.

SUMMARY OF THE INVENTION

In consideration of the problem of the prior art, an object of the present invention is to supply a wireless communication apparatus and a wireless communication method thereof having transmission strategy adjusting mechanism.

The present invention discloses a wireless communication apparatus having transmission strategy adjusting mechanism that includes a receiving circuit, a detection circuit, a statistics circuit, a strategy determining circuit and a transmission circuit. The receiving circuit is configured to receive data of a plurality of communication behaviors among a plurality of external apparatuses. The detection circuit is configured to detect a plurality of inter frame spaces (IFS) corresponding to the communication behaviors and record related time lengths and a set of communication parameters. The statistics circuit is configured to perform statistics on the inter frame spaces according to a plurality of time intervals to generate a plurality of inter frame space statistics data. The strategy determining circuit is configured to analyze at least one of the related time lengths, the set of the communication parameters and the inter frame space statistics data of the inter frame spaces according to at least one application requirement to generate a transmission parameter adjusting signal. The transmission circuit is configured to receive the transmission parameter adjusting signal to adjust a plurality of transmission parameters related to the inter frame space length to perform data transmission.

The present invention also discloses a wireless communication method having transmission strategy adjusting mechanism and used in a wireless communication apparatus. The wireless communication method includes steps outlined below. Data of a plurality of communication behaviors among a plurality of external apparatuses is received by a receiving circuit. A plurality of inter frame spaces corresponding to the communication behaviors are detected and related time lengths and a set of communication parameters are recorded by a detection circuit. Statistics is performed on the inter frame spaces according to a plurality of time intervals to generate a plurality of inter frame space statistics data by a statistics circuit. At least one of the related time lengths, the set of the communication parameters and the inter frame space statistics data of the inter frame spaces are analyzed according to at least one application requirement to generate a transmission parameter adjusting signal by a strategy determining circuit. The transmission parameter adjusting signal is received to adjust a plurality of transmission parameters related to the inter frame space length to perform data transmission by a transmission circuit.

These and other objectives of the present invention will no doubt become obvious to those of ordinary skill in the art behind reading the following detailed description of the preferred embodiments that are illustrated in the various figures and drawings.

BRIEF DESCRIPTION OF THE DRAWINGS

FIG. 3 illustrates a flow chart of a wireless communication method having transmission strategy adjusting mechanism according to an embodiment of the present invention.

DETAILED DESCRIPTION OF THE PREFERRED EMBODIMENTS

An aspect of the present invention is to provide a wireless communication apparatus and a wireless communication method thereof having transmission strategy adjusting mechanism to perform analysis and statistics on the inter frame spaces of the external apparatuses to adjust the transmission parameter adjusting signal of the transmission circuit such that the transmission efficiency of the transmission circuit is improved.

Figure 1:
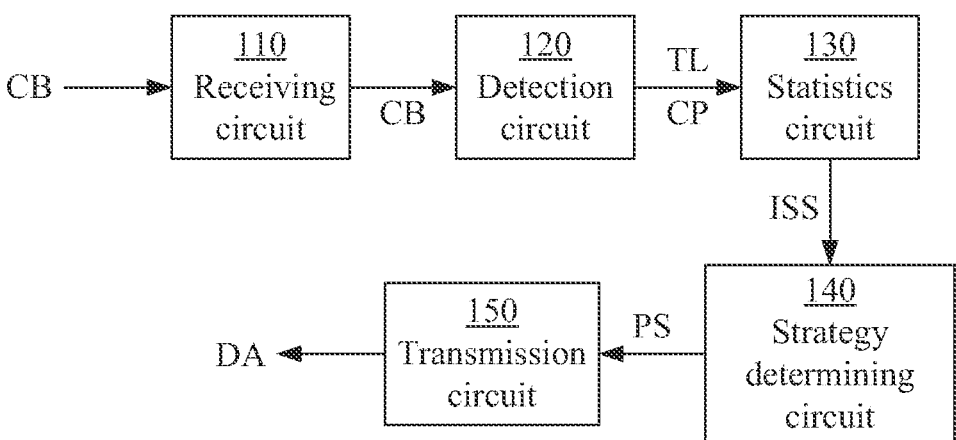
FIG. 1 illustrates a circuit diagram of a wireless communication apparatus having transmission strategy adjusting mechanism according to an embodiment of the present invention.

Reference is now made to FIG. 1. FIG. 1 illustrates a circuit diagram of a wireless communication apparatus 100 having transmission strategy adjusting mechanism according to an embodiment of the present invention. The wireless communication apparatus 100 can be an access point apparatus or a station apparatus.

The wireless communication apparatus 100 includes the receiving circuit 110, the detection circuit 120, the statistics circuit 130, the strategy determining circuit 140 and the transmission circuit 150.

The receiving circuit 110 is configured to receive data of communication behaviors CB among a plurality of external apparatuses. The detection circuit 120 is configured to detect a plurality of inter frame spaces (IFS) corresponding to the communication behaviors CB and record related time lengths TL and a set of communication parameters CP.

Figure 2:
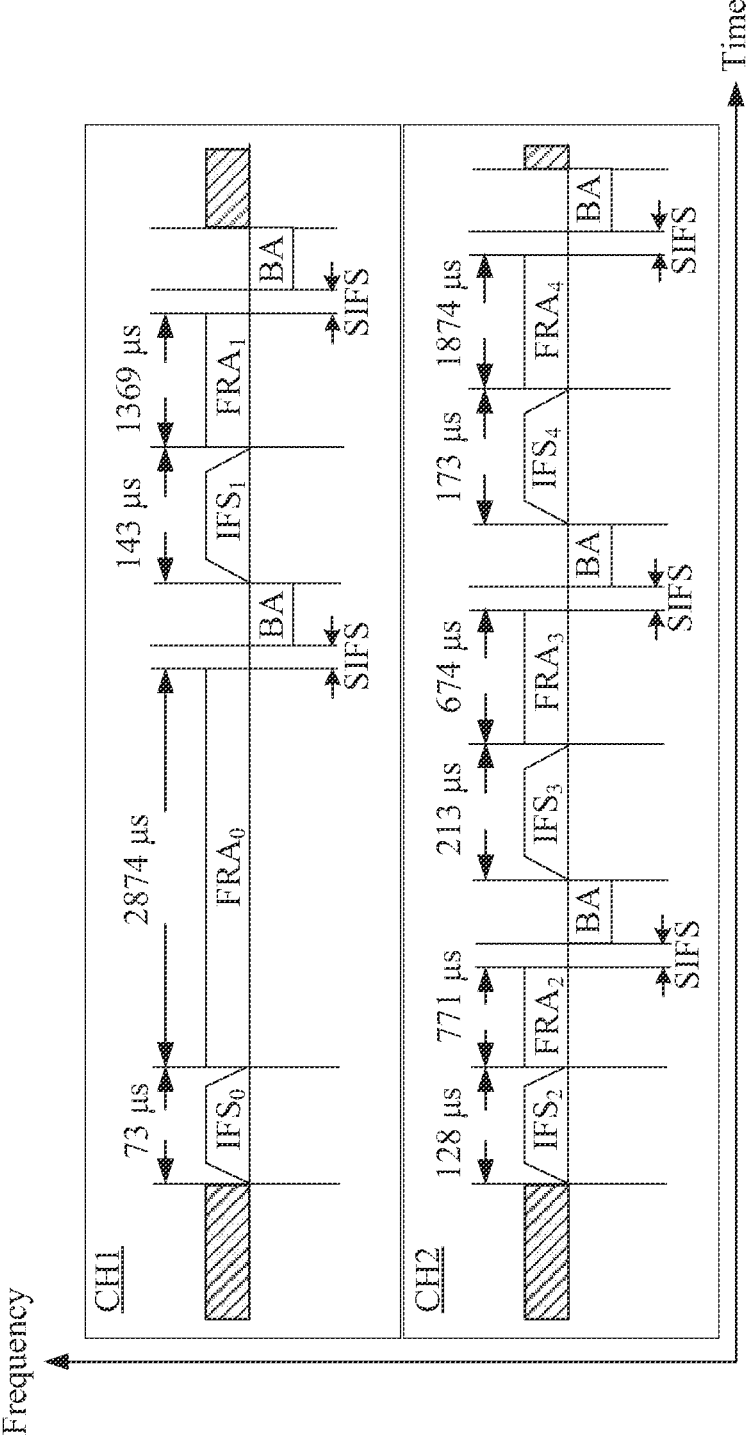
FIG. 2 illustrates the communication behaviors of a plurality of external apparatuses detected by the wireless communication apparatus according to an embodiment of the present invention.

Reference is now made to FIG. 2 at the same time. FIG. 2 illustrates the communication behaviors CB of a plurality of external apparatuses detected by the wireless communication apparatus 100 according to an embodiment of the present invention.

FIG. 2 exemplarily illustrates the communication behaviors CB among the external apparatuses in wireless channels CH1 and CH2. Each of the communication behaviors CB mainly includes frame sections for transmitting data packets and inter frame spaces between each two frame sections.

In an embodiment, the related time length TL includes a inter frame space time length and a frame section time length.

In the example of FIG. 2, an inter frame space IFS0, a frame section FRA0, an inter frame space IFS1 and a frame section FRA1 corresponding to the wireless channel CH1 are illustrated in turn. The time lengths of the inter frame space IFS0, the frame section FRA0, the inter frame space IFS1 and the frame section FRA1 are 73, 2874, 143 and 1369 microseconds (μs). In an embodiment, each of inter frame spaces includes sections of such as, but not limited to a backoff time, a contention window, an arbitration inter frame space (AIFS) or a combination thereof (not illustrated).

In the example of FIG. 2, an inter frame space IFS2, a frame section FRA2, an inter frame space IFS3, a frame section FRA3, an inter frame space IFS4 and a frame section FRA4 corresponding to the wireless channel CH2 are illustrated in turn. The time lengths of the inter frame space IFS2, the frame section FRA2, the inter frame space IFS3, the frame section FRA3, the inter frame space IFS4 and the frame section FRA4 are 128, 771, 213, 674, 173 and 1874 microseconds.

In an embodiment, between the frame section FRA0 and the inter frame space IFS1 of the wireless channel CH1, between the frame section FRA2 and the inter frame space IFS3 of the wireless channel CH2 and between the frame section FRA3 and the inter frame space IFS4 of the wireless channel CH2, a short frame section SIFS and a block acknowledgement section BA may be included or a point coordination function (PCF) section not illustrated in FIG. 2 may be selectively included. These sections are not required to be detected and recorded by the detection circuit 120.

In an embodiment, the communication parameters CP of an inter frame space are related to the frame sections neighboring to such an inter frame space and may include such as but not limited to access point group identification information, station identification information, frame attribute information, channel information or a combination thereof that the inter frame space corresponds to.

In an embodiment, the access point group identification information is an basic service set identifier (BSSID) that stands for a group, under the control of an access point apparatus, that the station apparatus for performing the transmission of the inter frame space corresponds to. The station identification information is a media access control (MAC) address that stands for the identification information of the station apparatus for performing the transmission of the inter frame space.

The frame attribute information includes a frame type, a frame subtype, a traffic identifier (TID) or a combination thereof. For example, the traffic identifier stands for the importance of the content of the frame. Different values of the traffic identifier ranging from the highest value to the lowest value correspond to the highest priority to the lowest priority of the content of the frame. In an embodiment, an audio type having the highest priority has the values of 7 and 6. An image type having the second highest priority has the values of 5 and 4. A best effort type having the second lowest priority has the values of 3 and 2. A background type having the lowest priority has the values of 1 and 0. Further, the channel information is a spectrum location.

It is appreciated that the individual parameters and the content thereof included in the communication parameters CP described above are merely an example.

In the example of FIG. 2, the frame section FRA0 corresponds to the BSSID having the value of 1, the MAC address having the value of 2, the TID having the value of 6 and the channel having the value of 1. The frame section FRA1 corresponds to the BSSID having the value of 1, the MAC address having the value of 1, the TID having the value of 0 and the channel having the value of 1.

The frame section FRA2 corresponds to the BSSID having the value of 0, the MAC address having the value of 0, the TID having the value of 6 and the channel having the value of 2. The frame section FRA3 corresponds to the BSSID having the value of 0, the MAC address having the value of 0, the TID having the value of 0 and the channel having the value of 2. The frame section FRA4 corresponds to the BSSID having the value of 0, the MAC address having the value of 0, the TID having the value of 0 and the channel having the value of 2.

For each of the inter frame spaces, a form of a set of parameters (IL, FL) is used to record the inter frame space time length and the frame section time length, and a form of a set of parameters (BSSID, MACADD, TID, CH) is used to record the communication parameters CP having the BSSID, the MAC address, the TID and the frequency spectrum location.

As a result, the inter frame space IFS0 is recorded as (IL=73, FL=2874) and (BSSID=1, MAC=2, TID=6, CH=1). The inter frame space IFS1 is recorded as (IL=143, FL=1369) and (BSSID=1, MAC=1, TID=0, CH=1). The inter frame space IFS2 is recorded as (IL=128, FL=771) and (BSSID=0, MAC=0, TID=6, CH=2). The inter frame space IFS3 is recorded as (IL=213, FL=674) and (BSSID=0, MAC=0, TID=0, CH=2). The inter frame space IFS4 is recorded as (IL=173, FL=1874) and (BSSID=0, MAC=0, TID=0, CH=2).

The statistics circuit 130 is configured to perform statistics on the inter frame spaces according to a plurality of time intervals to generate a plurality of inter frame space statistics data ISS. The statistics that the statistics circuit 130 performs includes such as but not limited to an accumulation statistics and/or an average statistics.

In an embodiment, the statistics circuit 130 may set a time interval for every 50 microseconds, in which each of the time intervals are in the range of 0~50 microseconds, 51~100 microseconds, 101~150 microseconds, 151~200 microseconds and 201~250 microseconds respectively.

The statistics circuit 130 performs statistics of inter frame space time length occurrence times, an inter frame space time length average, a subsequent frame section time length average or a combination thereof for each of the time intervals.

Take the time interval having the range of 201~250 microseconds as an example, only the time length of the inter frame space IFS3, which is 213 microseconds, is within such a range. The time length of the subsequent frame section FRA3 is 674 microseconds. For such a time interval, the time length occurrence times stand for the occurrence times of the inter frame spaces having the time length within such a range, which is 1. The time length average is the average time length of the inter frame spaces having the time length within such a range, which is 213 microseconds. The subsequent frame section time length average is the average time length of the frame section subsequent to the inter frame spaces having the time length within such a range, which is 674 microseconds.

Similarly, for the time interval having the range of 151~200 microsecond, only the time length of the inter frame space IFS4, which is 173 microseconds, is within such a range. The time length of the subsequent frame section FRA4 is 1874 microseconds. For such a time interval, the value of the time length occurrence times is 1. The value of the time length average is 173 microseconds. The value of the subsequent frame section time length average is 1874 microseconds.

For the time interval having the range of 101~150 microseconds, the time lengths of the inter frame space IFS1 and the inter frame space IFS2, which are 143 and 128 microseconds respectively, are within such a range. The time lengths of the subsequent frame sections FRA1 and FRA2 are 1369 and 771 microseconds. For such a time interval, the value of the time length occurrence times is 2. The value of the time length average is 135 microseconds (the average of 143 and 128). The value of the subsequent frame section time length average is 1070 microseconds (the average of 1369 and 771).

For the time interval having the range of 51~100 microseconds, only the time length of the inter frame space IFS0, which is 73 microseconds, is within such a range. The time length of the subsequent frame section FRA0 is 2874 microseconds. For such a time interval, the value of the time length occurrence times is 1. The value of the time length average is 73 microseconds. The value of the subsequent frame section time length average is 2874 microseconds.

For the time interval having the range of 0~50 microseconds, no time length of any inter frame space is within such a range. For such a time interval, the value of the time length occurrence times is 0. The value of the time length average is 0 microseconds. The value of the subsequent frame section time length average is 0 microseconds.

As a result, the inter frame space statistics data ISS includes the time length occurrence times, the time length average, the subsequent frame section time length average or a combination thereof of each of the time intervals described above.

The strategy determining circuit 140 is configured to analyze at least one of the related time lengths TL, the set of the communication parameters CP and the inter frame space statistics data ISS of the inter frame spaces according to at least one application requirement to generate a transmission parameter adjusting signal PS. In different embodiments, the related time length TL and the communication parameters CP of each of the inter frame spaces can be included in the inter frame space statistics data ISS and received together with the other content of the inter frame space statistics data ISS from the statistics circuit 130, or can be received from the detection circuit 120 directly.

The transmission circuit 150 is configured to receive the transmission parameter adjusting signal PS to adjust a plurality of transmission parameters thereof related to the inter frame space length to perform data transmission DA. The transmission parameters include such as, but not limited to a backoff time, a contention window, an arbitration inter frame space (AIFS) or a combination thereof. More specifically, since the inter frame spaces may include the backoff time, the contention window, the arbitration inter frame space (AIFS) or a combination thereof, the transmission circuit 150 may adjust the length of at least one of the backoff time, the contention window, the arbitration inter frame space (AIFS) or a combination thereof to adjust the length of the inter frame spaces.

In an embodiment, when the wireless communication apparatus 100 is a station apparatus, the application requirement may include a station aggressive transmission requirement such that the strategy determining circuit 140 determines a minimum time length from the inter frame space statistics data ISS and adjusts the transmission parameters of the transmission circuit 150 so that an inter frame space time length that the transmission circuit 150 performs data transmission is smaller than or equal to the minimum time length.

For example, the strategy determining circuit 140 may look for one of the inter frame space time lengths in the inter frame space statistics data ISS that has the minimum value as the minimum time length. In another example, the strategy determining circuit 140 may look for the inter frame spaces in the inter frame space statistics data ISS that has the access point group identification information same as that of the inter frame space statistics data ISS, and look for one of the inter frame space time lengths in these inter frame spaces that has the minimum value as the minimum time length. The transmission circuit 150 further adjusts the transmission parameters such that the inter frame space time length of the data transmission is smaller than or equal to the minimum time length.

In an embodiment, when the wireless communication apparatus 100 is a station apparatus, the application requirement may include an illegal communication reacting transmission requirement such that the strategy determining circuit 140 looks for an illegal communication behavior from the communication behaviors CB that has the access point group identification information and the frame attribute information same with those of the wireless communication apparatus 100 and has the station identification information different from that of the wireless communication apparatus 100. The strategy determining circuit 140 further determines a minimum time length from the inter frame space statistics data ISS and adjusts the transmission parameters of the transmission circuit 150 so that an inter frame space time length that the transmission circuit 150 performs data transmission is smaller than or equal to the minimum time length.

More specifically, such an illegal communication behavior is performed by an external apparatus different from the wireless communication apparatus 100, in which the external apparatus performs data transmission that corresponds to the type and the channel same as those of the data transmission performed by the wireless communication apparatus 100. Such an illegal communication behavior may have an inter frame space time length that is such as, but not limited to smaller than a predetermined threshold value. For example, the strategy determining circuit 140 may look for the inter frame space time length corresponding to such an external apparatus as the minimum time length. The transmission circuit 150 further adjusts the transmission parameters such that the inter frame space time length of the data transmission is smaller than or equal to the minimum time length.

In an embodiment, when the wireless communication apparatus 100 is a station apparatus, the application requirement may include an emergency transmission requirement such that the strategy determining circuit 140 identifies the access point group identification information, the frame attribute information and the station identification information of the communication behaviors CB, to adjust the transmission parameters of the transmission circuit 150 according to a relation between an emergency level of under-transmission data and the communication behaviors CB.

For example, based on the identification of the information described above, the strategy determining circuit 140 may determine whether the external apparatuses that perform the communication behaviors CB belongs to a group of apparatus same as the group that the wireless communication apparatus 100 belongs to under the control of the same access point apparatus. For the external apparatuses that belong to the same group under the control of the same access point apparatus, the strategy determining circuit 140 further determines the priority ranking according to the frame attribute information of the data transmission of the external apparatuses and the frame attribute information of the data transmission of the wireless communication apparatus 100.

When the priority of the data transmission of the wireless communication apparatus 100 is higher, the transmission circuit 150 thereof further adjusts the transmission parameters to decrease the inter frame space time length of the data transmission such that the data transmission of the wireless communication apparatus 100 can be performed first.

In an embodiment, when the wireless communication apparatus 100 is a station apparatus or an access point apparatus, the application requirement may include a channel switching requirement such that the strategy determining circuit 140 looks for the channel information of the communication behaviors CB to determine whether a channel switching is performed on the transmission circuit 150 according to the channel information.

In an embodiment, when the wireless communication apparatus 100 is an access point apparatus, the application requirement may include an average station resource scheduling requirement such that strategy determining circuit 140 identifies the station identification information and the frame attribute information of each of the communication behaviors CB to determine whether one of the external apparatuses occupies channel resource exceeding a threshold value to perform resource scheduling on the external apparatuses.

For example, after identifying the station identification information and the frame attribute information of each of the communication behaviors CB, the strategy determining circuit 140 determines that each of a part of the communication behaviors CB has a relatively smaller inter frame space time length within a longer time and considers that these communication behaviors CB occupy the channel resource exceeding the threshold value. The strategy determining circuit 140 adjusts the inter frame space time length of these communication behaviors CB by averaging or according to a predetermined ratio to accomplish the object of resource scheduling.

As a result, the wireless communication apparatus can perform analysis and statistics on the inter frame spaces of the external apparatuses to adjust the transmission parameter adjusting signal of the transmission circuit such that the transmission efficiency of the transmission circuit is improved.

Reference is now made to FIG. 3. FIG. 3 illustrates a flow chart of a wireless communication method 300 having transmission strategy adjusting mechanism according to an embodiment of the present invention.

In addition to the apparatus described above, the present disclosure further provides the wireless communication method 300 that can be used in such as, but not limited to, the wireless communication apparatus 100 in FIG. 1. As illustrated in FIG. 3, an embodiment of the wireless communication method 300 includes the following steps.

In step S310, the data of the plurality of communication behaviors CB among the plurality of external apparatuses is received by the receiving circuit 110.

In step S320, the plurality of inter frame spaces corresponding to the communication behaviors CB are detected and the related time lengths TL and the set of communication parameters CP are recorded by the detection circuit 120.

In step S330, statistics is performed on the inter frame spaces according to the plurality of time intervals to generate the plurality of inter frame space statistics data ISS by the statistics circuit 130.

In step S340, at least one of the related time lengths TL, the set of the communication parameters CP and the inter frame space statistics data ISS of the inter frame spaces are analyzed according to at least one application requirement to generate the transmission parameter adjusting signal PS by the strategy determining circuit 140.

In step S350, the transmission parameter adjusting signal PS is received to adjust the plurality of transmission parameters related to the inter frame space length to perform data transmission DA by the transmission circuit 150.

It is appreciated that the embodiments described above are merely an example. In other embodiments, it should be appreciated that many modifications and changes may be made by those of ordinary skill in the art without departing, from the spirit of the disclosure.

In summary, the present invention discloses the wireless communication apparatus and the wireless communication method thereof having transmission strategy adjusting mechanism to perform analysis and statistics on the inter frame spaces of the external apparatuses to adjust the transmission parameter adjusting signal of the transmission circuit such that the transmission efficiency of the transmission circuit is improved.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A wireless communication apparatus having transmission strategy adjusting mechanism comprising:

a receiving circuit configured to receive data of a plurality of communication behaviors among a plurality of external apparatuses;

a detection circuit configured to detect a plurality of inter frame spaces (IFS) comprised by the communication behaviors and record related time lengths and a set of communication parameters;

a statistics circuit configured to perform statistics on the inter frame spaces according to a plurality of time intervals to generate a plurality of inter frame space statistics data;

a strategy determining circuit configured to analyze at least the related time length and the inter frame space statistics data of the inter frame spaces according to an application requirement to generate a transmission parameter adjusting signal, wherein the related time lengths at least comprise an inter frame space time length;

a transmission circuit configured to receive the transmission parameter adjusting signal to adjust a plurality of transmission parameters related to the inter frame space time length according to the transmission parameter adjusting signal generated based on the analysis of the related time lengths and the inter frame space statistics data of the inter frame spaces to perform data transmission such that the adjusted transmission parameters satisfy the application requirement; and the strategy determining circuit further determines a minimum time length from the inter frame space statistics data and adjusts the transmission parameters of the transmission circuit so that the inter frame space time length that the transmission circuit performs data transmission is smaller than or equal to the minimum time length.

2. The wireless communication apparatus of claim 1, wherein the communication parameters comprises access point group identification information, station identification information, frame attribute information, channel information or a combination thereof.

3. The wireless communication apparatus of claim 1, wherein the related time length further comprises a subsequent frame section time length, and the inter frame space statistics data comprises an inter frame space time length occurrence times in each of the time intervals, an inter frame space time length average, a subsequent frame section time length average or a combination thereof.

4. The wireless communication apparatus of claim 1, wherein the application requirement comprises a station aggressive transmission requirement such that the strategy determining circuit determines a minimum time length from the inter frame space statistics data and adjusts the transmission parameters of the transmission circuit so that the inter frame space time length that the transmission circuit performs data transmission is smaller than or equal to the minimum time length.

5. The wireless communication apparatus of claim 1, wherein the application requirement comprises an illegal communication reacting transmission requirement such that the strategy determining circuit analyzes the related time lengths and the inter frame space statistics data of the inter frame spaces and looks for an illegal communication behavior from the communication behaviors that has access point group identification information and frame attribute information same with those of the wireless communication apparatus and has station identification information different from that of the wireless communication apparatus.

6. The wireless communication apparatus of claim 1, wherein the strategy determining circuit is configured to analyze the set of the communication parameters according to an emergency transmission requirement such that the strategy determining circuit identifies access point group identification information, frame attribute information and station identification information of the communication behaviors, to adjust the transmission parameters of the transmission circuit according to a relation between an emergency level of under-transmission data and the communication behaviors.

7. The wireless communication apparatus of claim 1, wherein the strategy determining circuit is configured to analyze the set of the communication parameters according to a channel switching requirement such that the strategy determining circuit looks for channel information of the communication behaviors to determine whether a channel switching is performed on the transmission circuit according to the channel information.

8. The wireless communication apparatus of claim 1, wherein the strategy determining circuit is configured to analyze the set of the communication parameters according to an average station resource scheduling requirement such that strategy determining circuit identifies station identification information and frame attribute information of each of the communication behaviors to determine whether one of the external apparatuses occupies channel resource exceeding a threshold value to perform resource scheduling on the external apparatuses.

9. The wireless communication apparatus of claim 1, wherein the wireless communication apparatus is an access point apparatus or a station apparatus.

10. The wireless communication apparatus of claim 1, wherein the transmission parameters comprise a backoff time, a contention window, an arbitration inter frame space (AIFS) or a combination thereof.

11. A wireless communication method having transmission strategy adjusting mechanism and used in a wireless communication apparatus, the wireless communication method comprises:

receiving data of a plurality of communication behaviors among a plurality of external apparatuses by a receiving circuit;

detecting a plurality of inter frame spaces comprised by the communication behaviors and record related time lengths and a set of communication parameters by a detection circuit;

performing statistics on the inter frame spaces according to a plurality of time intervals to generate a plurality of inter frame space statistics data by a statistics circuit;

analyzing at least the related time lengths and the inter frame space statistics data of the inter frame spaces according to an application requirement to generate a transmission parameter adjusting signal by a strategy determining circuit, wherein the related time lengths at least comprise an inter frame space time length;

receiving the transmission parameter adjusting signal to adjust a plurality of transmission parameters related to the inter frame space time length according to the transmission parameter adjusting signal generated based on the analysis of the related time lengths and the inter frame space statistics data of the inter frame spaces to perform data transmission by a transmission circuit such that the adjusted transmission parameters satisfy the application requirement; and the strategy determining circuit further determines a minimum time length from the inter frame space statistics data and adjusts the transmission parameters of the transmission circuit so that the inter frame space time length that the transmission circuit performs data transmission is smaller than or equal to the minimum time length.

12. The wireless communication method of claim 11, wherein the communication parameters comprises access point group identification information, station identification information, frame attribute information, channel information or a combination thereof.

13. The wireless communication method of claim 11, wherein the related time length further comprises a subsequent frame section time length, the inter frame space statistics data comprises an inter frame space time length occurrence times in each of the time intervals, an inter frame space time length average, a subsequent frame section time length average or a combination thereof.

14. The wireless communication method of claim 11, wherein the application requirement comprises a station aggressive transmission requirement such that the strategy determining circuit determines a minimum time length from the inter frame space statistics data and adjusts the transmission parameters of the transmission circuit so that the inter frame space time length that the transmission circuit performs data transmission is smaller than or equal to the minimum time length.

15. The wireless communication method of claim 11, wherein the application requirement comprises an illegal communication reacting transmission requirement such that the strategy determining circuit analyzes the related time lengths and the inter frame space statistics data of the inter frame spaces and looks for an illegal communication behavior from the communication behaviors that has access point group identification information and frame attribute information same with those of the wireless communication apparatus and has station identification information different from that of the wireless communication apparatus.

16. The wireless communication method of claim 11, wherein the strategy determining circuit is configured to analyze the set of the communication parameters according to an emergency transmission requirement such that the strategy determining circuit identifies access point group identification information, frame attribute information and station identification information of the communication behaviors, to adjust the transmission parameters of the transmission circuit according to a relation between an emergency level of under-transmission data and the communication behaviors.

17. The wireless communication method of claim 11, wherein the strategy determining circuit is configured to analyze the set of the communication parameters according to a channel switching requirement such that the strategy determining circuit looks for channel information of the communication behaviors to determine whether a channel switching is performed on the transmission circuit according to the channel information.

18. The wireless communication method of claim 11, wherein the strategy determining circuit is configured to analyze the set of the communication parameters according to an average station resource scheduling requirement such that strategy determining circuit identifies station identification information and frame attribute information of each of the communication behaviors to determine whether one of the external apparatuses occupies channel resource exceeding a threshold value to perform resource scheduling on the external apparatuses.

19. The wireless communication method of claim 11, wherein the wireless communication apparatus is an access point apparatus or a station apparatus.

20. The wireless communication method of claim 11, wherein the transmission parameters comprise a backoff time, a contention window, an arbitration inter frame space or a combination thereof.

* * * * *